(12) United States Patent
Yokochi

(10) Patent No.: US 6,252,685 B1
(45) Date of Patent: Jun. 26, 2001

(54) OPTICAL RECORDING MEDIUM AND APPARATUS OF JUDGING FAKE THEREOF

(75) Inventor: Yoshinari Yokochi, Tokyo (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/433,906

(22) Filed: Nov. 4, 1999

(30) Foreign Application Priority Data

Nov. 6, 1998 (JP) .................................................. 10-332018

(51) Int. Cl.[7] .............................. G03H 1/00; G03H 1/30; B42D 15/00; G06K 9/76; G01B 9/021
(52) U.S. Cl. ............................ 359/2; 359/9; 359/25; 283/86; 283/113; 283/901; 283/902; 356/71; 356/347
(58) Field of Search ........................... 359/2, 9, 25, 29, 359/562; 283/113, 86, 94, 901, 902; 356/71, 347

(56) References Cited

U.S. PATENT DOCUMENTS

| | | | |
|---|---|---|---|
| 4,129,382 | * | 12/1978 | Greenaway .......................... 250/550 |
| 4,202,626 | * | 5/1980 | Mayer, Jr. et al. ................ 250/222.1 |
| 4,211,918 | * | 7/1980 | Nyfeler et al. ........................ 235/487 |
| 4,280,037 | * | 7/1981 | Schmidhauser ...................... 235/472 |
| 4,501,439 | * | 2/1985 | Antes ..................................... 283/86 |
| 5,336,871 | * | 8/1994 | Colgate, Jr. ........................... 235/440 |
| 5,483,363 | * | 1/1996 | Holmes et al. ........................ 283/86 |
| 5,607,188 | * | 3/1997 | Bahns et al. .......................... 283/113 |
| 5,790,703 | * | 8/1998 | Wang ................................... 283/113 |

FOREIGN PATENT DOCUMENTS

| | | |
|---|---|---|
| 9-319849 | 12/1997 | (JP) . |
| 10-143603 | 5/1998 | (JP) . |
| 10-143629 | 5/1998 | (JP) . |
| 10-171334 | 6/1998 | (JP) . |
| 10-198259 | 7/1998 | (JP) . |

* cited by examiner

Primary Examiner—Jon Henry
(74) Attorney, Agent, or Firm—Anderson, Kill & Olick P.C.

(57) ABSTRACT

A phase watermark hologram "W" is composed of a blaze having binary phase difference of $2\pi \times n$, where "n" is a natural number of more than 1. An watermark appears in response to phase difference, which changes by a faked blaze. A phase watermark hologram "W" and a phase hologram "D" indicating data are formed on a same surface of a substrate mixed in arbitrary locations and arbitrary ratio of both holograms.

2 Claims, 9 Drawing Sheets

100a

| D | W | D | D | W |
|---|---|---|---|---|
| D | W | D | W | D |
| W | D | W | D | W |
| D | W | D | W | D |
| W | D | W | D | D |

OPTICAL RECORDING MEDIUM AND APPARATUS OF JUDGING FAKE THEREOF

BACKGROUND OF THE INVENTION

1. Field of the Invention

The present invention relates to an optical recording medium recorded with a hologram and an apparatus of judging a fake, particularly, relates to an optical recording medium suitable for recording all of or a part of information by a hologram on a medium such as a pre-paid card, a cash card for a cash dispenser or an automatic teller machine, a driver license or a membership card, and an apparatus of judging a fake of such a card or information.

2. Description of the Related Art

FIG. 1 shows a binary optics reading apparatus disclosed in the Japanese Patent Laid-open Publication No. 9-319849/1997 as the prior art. Binary optics 10a through 10c, the reference number of the binary optics is hereinafter called as 10 in general, formed on a card 1 are diffraction gratings, which are designed for concentrating intensity of diffraction light on the first order and the second order diffraction light 23a and 23b, when they are irradiated by monochromatic light 21 emitted from an illuminating device 20 through a half mirror 25. These first order diffraction light 23a and second order diffraction light 23b are received by a first order diffraction light receptor 30a and a second order diffraction light receptor 30b respectively. Light reflected by the half mirror 25 is received by an illuminating light receptor 24 through the half mirror 25 so as to detect intensity of the illuminating light or the monochromatic light 21. A diffraction efficiency of the diffraction grating 10 can be obtained by dividing a sum of an intensity of the first order diffraction light 23a and an intensity of the second order diffraction light 23b by an intensity of the illuminating light or the monochromic light 21. Therefore, it is judged that the card 1 is a "true" card, in a case that the diffraction efficiency exceeds a predetermined value and it is judged that the card 1 is a "fake" card, in a case that the diffraction efficiency is less than the predetermined value. Accordingly, the prior art standardizes diffraction efficiency for judging the validity of the card 1 as "true" or "fake".

The diffraction grating 10 utilized in the prior art is a phase hologram, which is described in the "O plus E" magazine, Dec. 1996 issue, on pages 83 through 88 titled as "The most suitable method of computer generated hologram". Specifically, phase distribution in response to interference fringes of a diffraction grating can be obtained by the Fourier reverse transform of location information of diffraction light in response to a desired angle of diffraction light by a computer. The diffraction grating 10 can be formed on an optical recording medium such as a card by transferring a blaze in response to the phase distribution formed on a substrate, wherein the blaze is formed on a substrate by applying such the semiconductor manufacturing technology disclosed in the Japanese Patent Laid-open Publication No. 9-230121/1997. Such a diffraction grating element manufactured by the process mentioned above is called a binary optics.

A phase hologram is explained with referring FIGS. 2 and 3. FIG. 2 is a sectional view of a transmission phase hologram or a diffraction optical element, which is made of the transparent light transmission resin 1a. A blaze 4, which is in response to phase difference, is formed in the transparent light transmission resin 1a in order to make phase difference occur to an incident light 2, and make transmission light generate the diffraction phenomenon and make the transmission light become a diffraction light 3a. The example shown in FIG. 2 is a 3 quantizing level phase hologram of which one phase difference is specified as 2π/3 by dividing one period, that is, 2 π of the wavelength λ of the incident light 2 by 3. The blaze 4 comprises 3 stages of phase difference including 0 π, which is a position of no phase shifting. A simplest phase hologram is a binary phase hologram of which one phase difference is specified as π by dividing one period, that is, 2π of the wavelength λ of an incident light by 2. A blaze of a binary phase hologram comprises 2 stages of phase difference including 0π. The more increases a number of values, the more increases diffraction efficiency. However, a production process becomes complicated.

FIG. 3 shows a general reflection phase hologram. In FIG. 3, a metallic reflection film 5 such as aluminum is formed on a blaze surface 1b in a transparent light transmission resin 1a and is coated with a protection film 6 in order to protect the metallic reflection film 5, and make the reflected light generate the diffraction phenomenon so as to make an incidental light 2 become a diffraction light 3b.

It seems, at a glance, hard to fake such a diffraction optical element mentioned above because the diffraction optical element can not be produced unless utilizing an expensive semiconductor manufacturing facility in conjunction with performing high-grade calculation by a computer. However, since the diffraction optical element is actually a simple blaze, there exists a problem that the blaze can be easily duplicated or faked by making a mold of the blaze with pouring liquid resin over the blaze and letting the resin harden, and by pouring liquid resin into the mold and letting the resin harden.

In the case of a transmission phase hologram shown in FIG. 2, for example, a peeling off layer can be formed on the blaze surface 1b of the blaze 4 by evaporating thin metal film on the blaze surface 1b of the blaze 4. A mold of which concave-convex shapes are formed inversely against the blaze 4 can be produced by pouring liquid resin over the peeling off layer of the blaze 4 and by peeling off the resin with the peeling off layer after the resin hardened. The peeling off layer of the mold is reinforced, and liquid resin is poured into the mold and hardened. Finally, a fake blaze can easily be produced.

In the case of a reflection phase hologram shown in FIG. 3, since the blaze surface 1b is covered with the metallic reflection film 5 and the protection film 6, it seems hard to fake a reflection phase hologram in comparison with a transmission phase hologram. However, the metallic reflection film 5 and the protection film 6 can easily be peeled off and then the blaze surface 1b can easily be exposed if they are soaked in the strong alkali solution. Accordingly, the blaze 4 can easily be faked as the same process as the faking process of the transmission phase hologram mentioned above.

In addition thereto, a height accuracy of the blaze surface 1b, which is faked or duplicated, deteriorates worse than that of the rue blaze surface 1b and then the diffraction efficiency deteriorates. Since the judging method of the card 1 whether it is a true card or a fake card depicted in FIG. 1 is based on the diffraction efficiency, it seems that such a fake blaze surface can easily be judged as fake. However, since the card 1 is directly handled by hand, stain such as a fingerprint, grease, dirt from hands or dust may stick on the surface of the card 1 and deteriorates the diffraction efficiency. Therefore, a threshold value of the diffraction efficiency utilized for judging whether it is true or fake is obliged to designate to rather lower value in consideration of such stain. Accordingly, there exists another problem that a fake produced as mentioned above can not be judged or discriminated properly.

SUMMARY OF THE INVENTION

Accordingly, in consideration of the above-mentioned problems of the prior art, an object of the present invention is to provide an optical recording medium and an apparatus of judging a fake thereof, which can accurately judge whether an optical recording medium is true or fake when a hologram is recorded for the purpose of judgement.

In order to achieve the above object, the present invention provides, according to an aspect thereof, an optical recording medium and an apparatus of judging a fake. The apparatus records a watermark hologram, which appears when a phase difference changes, on the optical recording medium in consideration of that a phase difference changes if a blaze constituting a hologram is faked.

According to an aspect of the present invention, there provided an optical recording medium in which a blaze having a binary phase difference of $2\pi \times n$ is formed as a phase watermark hologram, where "n" is a natural number of more than 1.

According to another aspect of the present invention, there provided an apparatus of judging a fake for judging whether an optical recording medium in which a blaze having a binary phase difference of $2\pi \times n$ is formed as a phase watermark hologram, where "n" is a natural number of more than 1, is true or fake, the apparatus of judging a fake comprising illuminating means for illuminating the phase watermark hologram by monochromatic light, two-dimensional image sensing means for taking image of diffraction light generating the phase watermark hologram, zero-order light processing means for replacing zero-order light component of intensity distribution signal of diffraction light taken by the two-dimensional image sensing means with "0" (zero) and for amplifying total intensity distribution signals of diffraction light excluding zero-order light, and judging means for judging whether the optical recording medium is true or fake by comparing the intensity distribution signal of diffraction light processed by the zero-order light processing means with a reference data.

Other object and further features of the present invention will be apparent from the following detailed description when read in conjunction with the accompanying drawings.

BRIEF DESCRIPTION OF DRAWINGS

FIG. 11 is a plan view of an intensity distribution of diffraction light, in a case that a watermark hologram "W" shown in FIG. 9 is "true". In this case, only a white spot of a high intensity, which is a focal point of a zero-order light transmitted through a watermark hologram, appears in the center of the image.

DETAILED DESCRIPTION OF THE PREFERRED EMBODIMENTS

[Embodiment]

Figure 1:
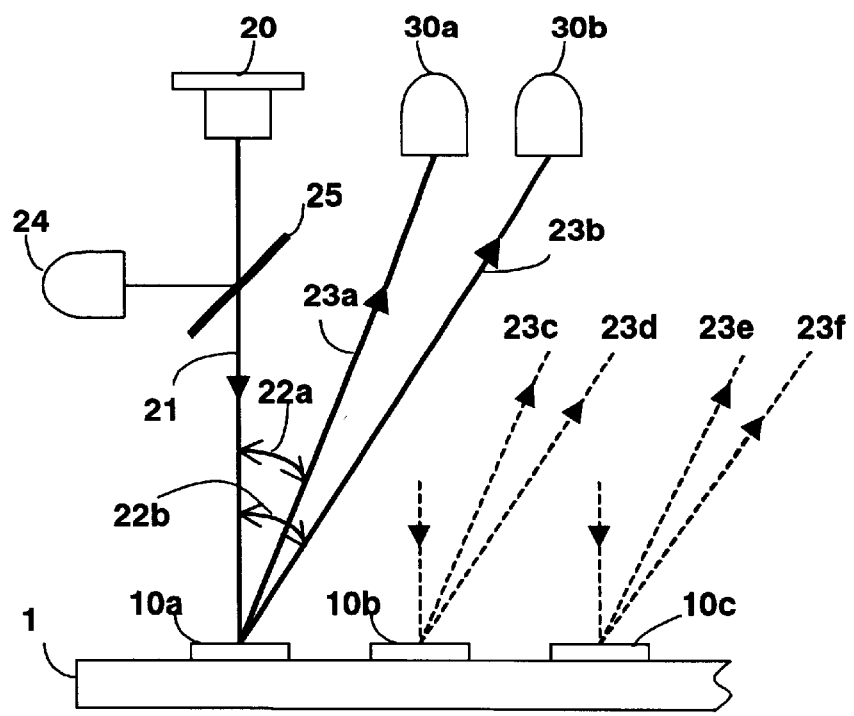
FIG. 1 shows a configuration of an apparatus of reading binary optics in the prior art.
Figure 2:
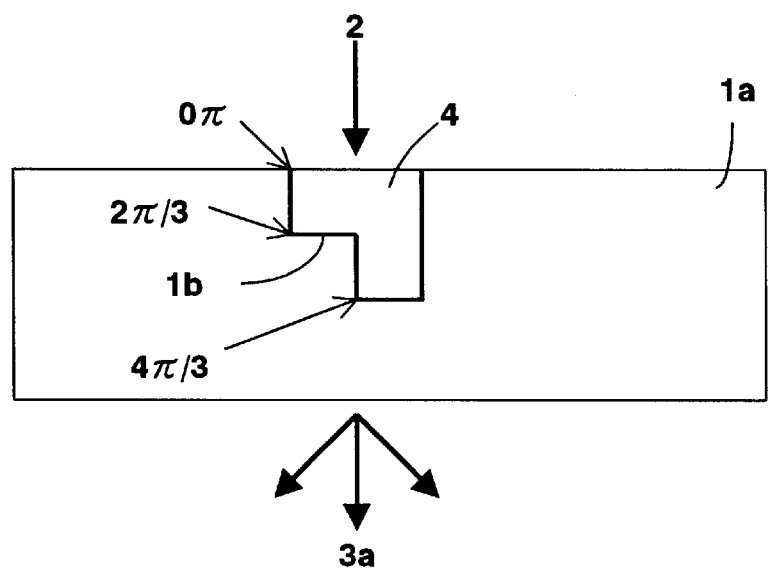
FIG. 2 is a sectional view of a transmission phase hologram of the prior art.
Figure 3:
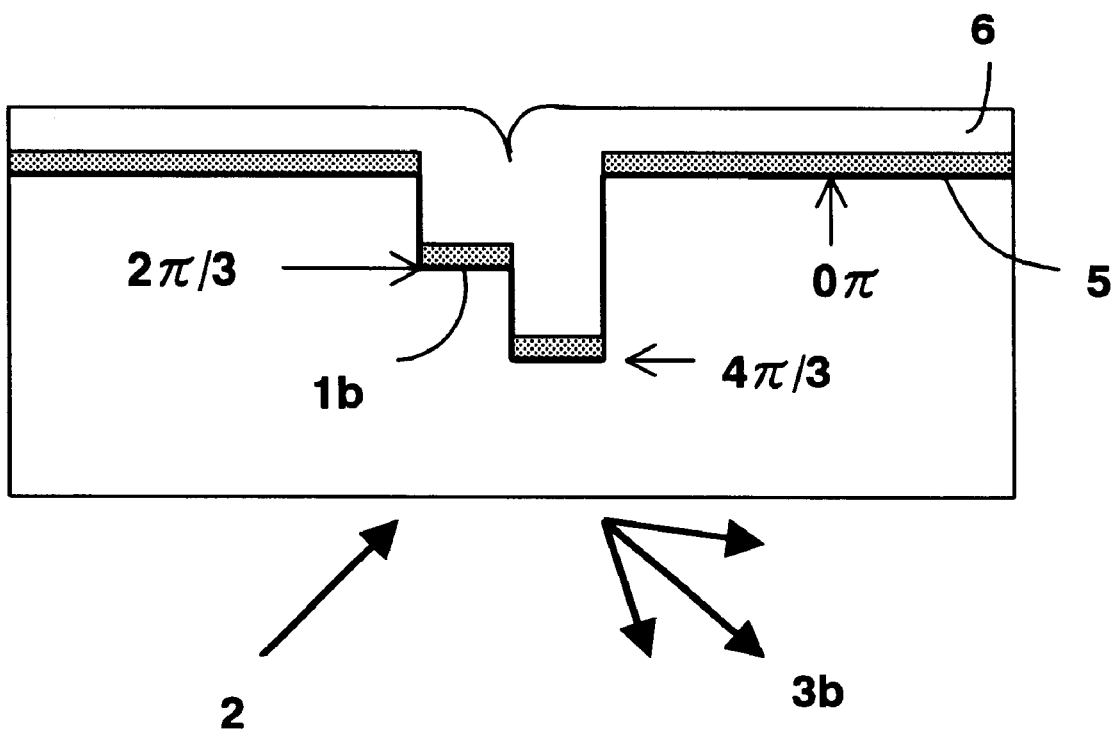
FIG. 3 is a sectional view of a reflection phase hologram of the prior art.
Figures 4A, 4B:
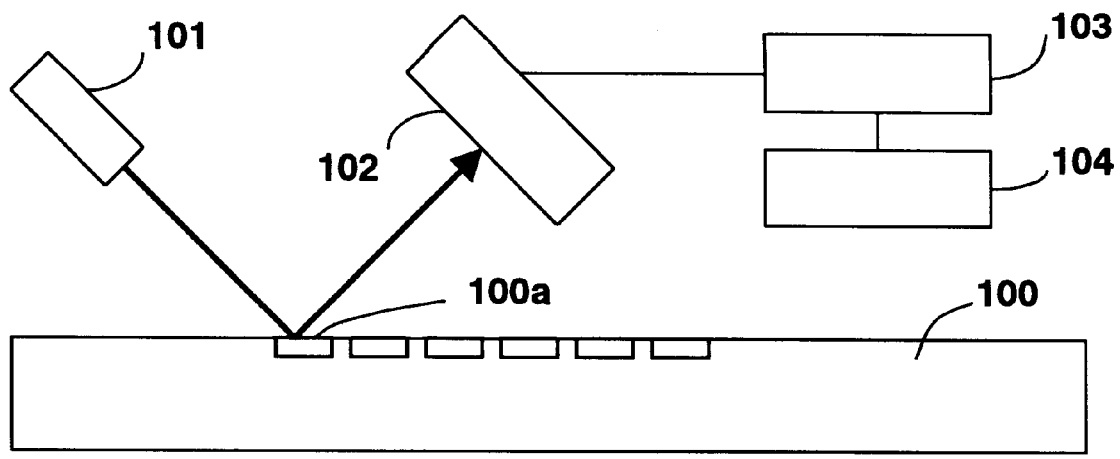
FIG. 4(a) shows a constitutional diagram of an optical recording medium and an apparatus of judging a fake according to an embodiment of the present invention.
FIG. 4(b) shows an exemplary layout of a data hologram "D" and a watermark hologram "W" in the hologram unit cell 100a shown in FIG. 4(a).

FIG. 4(a) shows a constitutional diagram of an optical recording medium and an apparatus of judging a fake according to an embodiment of the present invention.

FIG. 4(b) shows an exemplary layout of a data hologram "D" and a watermark hologram "D" in the hologram unit cell 100a shown in FIG. 4(a).

In FIG. 4(a), the constitutional diagram comprises a card 100 of embedding holograms as an optical recording medium, an illuminating device 101, a light receptor 102 of diffraction light, a zero-order light processing apparatus 103 and a recognition apparatus 104 for diffraction light, wherein a zero-order light is a light transmitting through or being reflected by a hologram without any interference or diffraction. The card 100 is composed of a plurality of hologram unit cells, wherein one unit of the hologram unit cell is hereinafter called a hologram unit cell 100a. The hologram unit cell 100a comprises a plurality of data holograms "Ds" of reflection phase and watermark holograms "Ws". The hologram unit cell 100a is divided into 5×5 pieces of regions. Arbitrary quantities of data holograms "Ds" and watermark holograms "Ws" are allocated in an arbitrary region on the hologram unit cell 100a as shown in FIG. 4(b). In addition thereto, quantities of the data hologram "D" and the watermark hologram "W", dimensions and shape of the data hologram "D" and the watermark hologram "W" and the hologram unit cell 100a can be designated freely in accordance with illuminating conditions such as beam profile of illuminating light inherent to the illuminating device 101.

The card 100 is conveyed by a conveying apparatus, which is not shown in FIG. 4(*a*), and the data holograms "Ds" and the watermark holograms "Ws" are irradiated by a coherence light emitted from the illuminating device 101. The data and watermark holograms "Ds" and "Ws" reflect an illuminating light.

The illuminating light is reflected and interfered, and then diffracted. The diffraction light is finally received by the light receptor 102. The light receptor 102 is a two-dimensional image sensor such as a CCD (Charge Coupled Device) and a PD (Photo Diode). Accordingly, the light receptor 102 can measure location and intensity of a two-dimensional diffraction light. A intensity distribution signal of diffraction light, which is outputted from the light receptor 102, is replaced an intensity of zero-order light with "0" by the zero-order light processing apparatus 103 and a total intensity of diffraction light except zero-order light is amplified by a predetermined gain and transferred to the recognition apparatus 104 for diffraction light. The recognition apparatus 104 compares data transferred from the zero-order light processing apparatus 103 with a plurality of intensity distribution data of diffraction light as a reference data previously registered and judges whether the card 100 is a true card or a fake card.

Figure 5:
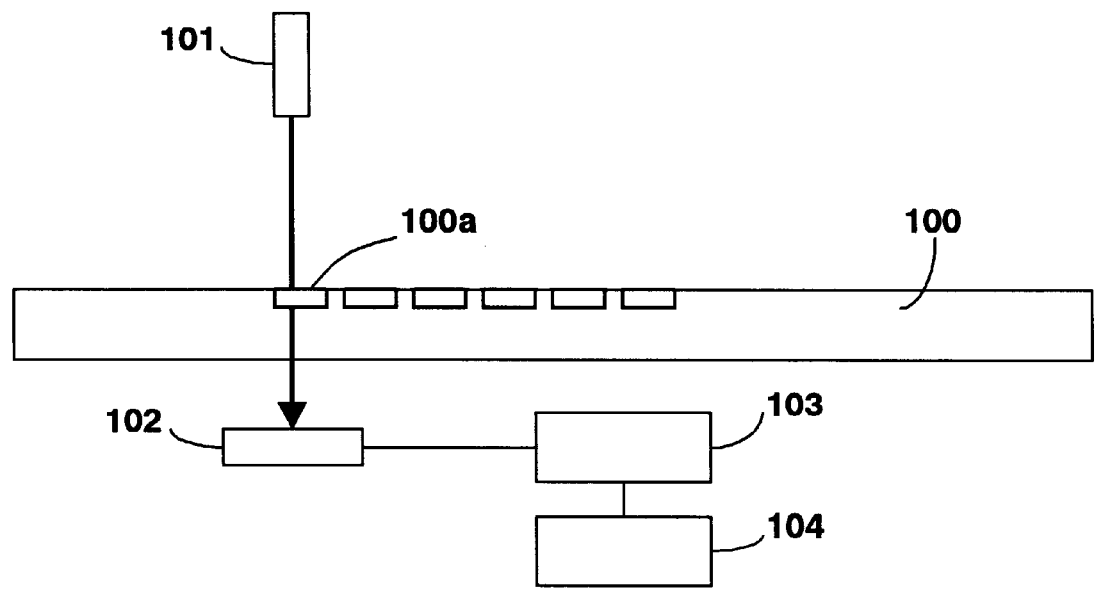
FIG. 5 shows another constitutional diagram of an optical recording medium and an apparatus of judging a fake according to the embodiment of the present invention.

Further, in a case that data and watermark holograms "Ds" and "Ws" are constituted by the transmission phase hologram, locations of the illuminating device 101 and the light receptor 102 are reallocated so as to receive transmission light through the card 100 as shown in FIG. 5 in comparison with FIG. 4(*a*). In this case, an illuminating light interferes while the light is transmitting through the data and watermark holograms "Ds" and "Ws", which are allocated in the hologram unit cell 100*a*, and diffracted light passes through the card 100 and enters into the light receptor 102.

Figure 6:
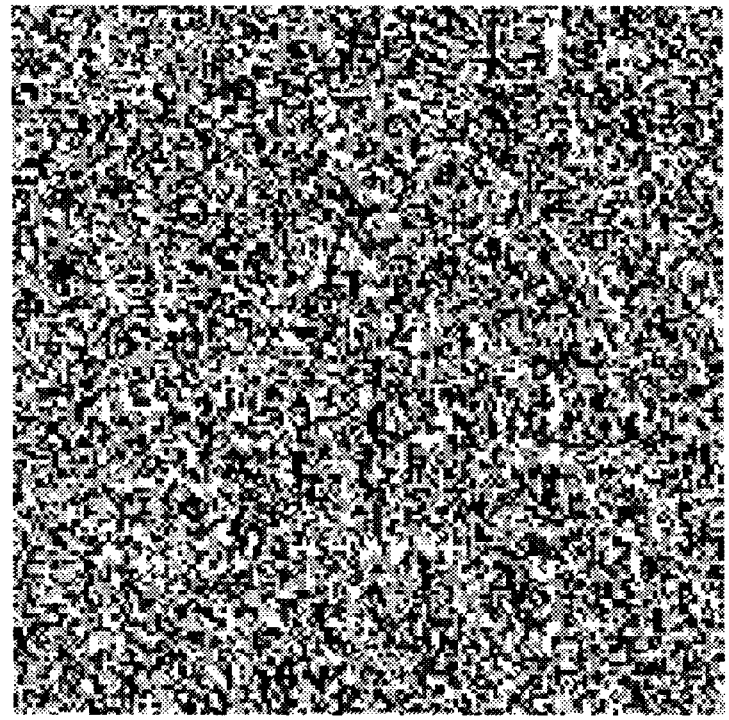
FIG. 6 is a plan view of a data hologram "D" shown in FIG. 4(b) as a bit map image.

The data hologram "D" indicates data such as balance of a pre-paid card and a discrimination number or a card number of a cash card. FIG. 6 shows a 5 quantizing level transmission phase hologram as one example of the data hologram "D". The "5 quantizing level" is that a blaze comprises 5 stages of phase differences of which one phase difference is specified as $2\pi/5$ by dividing one period, that is, $2\pi$ of the wavelength$\lambda$ of the incident light by 5, including $0\pi$, which is a position of no phase shifting. In addition thereto, FIG. 6 is shown as a bit map image by converting the 5 stages of phase differences into a gray scale of minimum "0" and maximum 255.

Figure 7:
FIG. 7 is a plan view of an intensity distribution of diffraction light in accordance with the data hologram "D" shown in FIG. 6.

These phase differences can be calculated from allocation information of diffraction light by performing the Fourier reverse transform by utilizing a computer. A blaze in response to the phase distribution is formed on a substrate by applying the semiconductor manufacturing technology disclosed, for instance, in the Japanese Patent Laid-open Publication No. 9-230121/1997 and then a data hologram "D" can be produced by transferring the blaze on the substrate to an optical recording medium such as a card. FIG. 7 shows a picture of a hologram reconstructed image. The picture is an intensity distribution of diffraction light, which is generated by the interference phenomenon of light with irradiating the data hologram shown in FIG. 6 by an illuminating light, and is taken by the light receptor 102. Levels of quantizing are not limited to 5. Any levels of quantizing more than 2 are acceptable if it functions as a hologram.

Figure 8A:
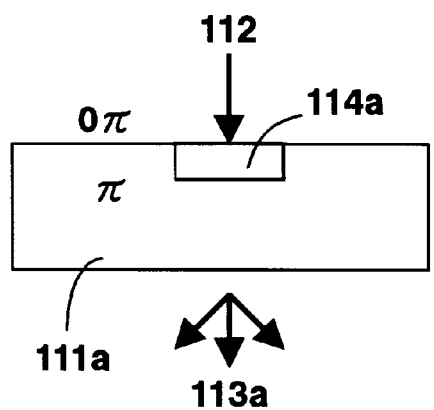
FIG. 8(a) is a sectional view of a watermark hologram "W" shown in FIG. 4(b) having a blaze of a phase difference of $\pi$.
Figure 8B:
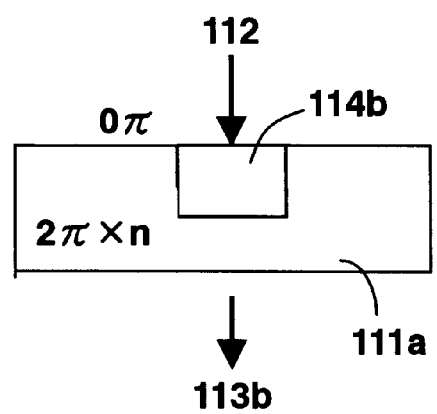
FIG. 8(b) is a sectional view of a watermark hologram "W" shown in FIG. 4(b) having a blaze of a phase difference of $2\pi \times n$.

The watermark hologram "W" represents "watermark" information for discriminating a fake. The "watermark" does not appear in a light signal received by the light receptor 102, in a case that an illuminating light is irradiated on a true hologram unit cell. However, in a case that the illuminating light is irradiated on a fake hologram unit cell, the "watermark" appears. Further details will be depicted. A producing method of a watermark hologram is similar to that of the data hologram "D". However, a major difference is that it is designed by binary as shown in FIGS. 8(*a*) and 8(*b*). The binary is that a blaze is formed by 2 stages of phase differences of which one phase difference is specified as $\pi$ by dividing one period, that is, $2\pi$ of the wavelength$\lambda$ of the incident light by 2, including $0\pi$, which is a position of no phase shifting. In FIG. 8(*a*), a depth of a blaze 114*a* formed in a light transmission resin 111*a* is $\pi$, that is, the depth is equal to a half of one period $2\pi$ of the wavelength $\lambda$ of an incident light 112. Accordingly, the incident light 112 irradiated on the blaze 114*a* is interfered and a diffraction light 113*a* is generated. On the other hand, in FIG. 8(*b*), a depth of a blaze 114*b* is $2\pi\times n$, that is, the depth is equal to "n" times of one period $2\pi$ of the wavelength$\lambda$ of the incident light 112. In other words, no phase difference is caused by the blaze 114*b*. Accordingly, the incident light 112 passes through the blaze 114*b* without any interference and becomes a transmission light 113*b*.

Figure 9:
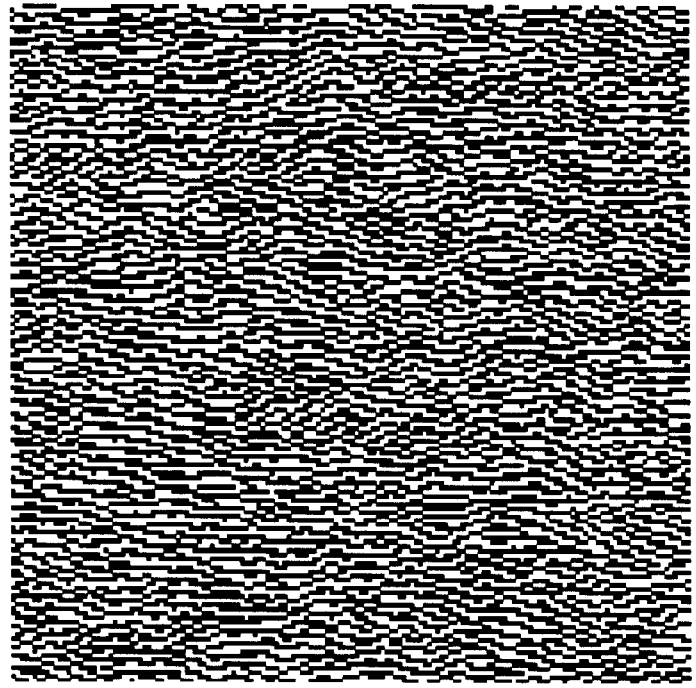
FIG. 9 is a plan view of a watermark hologram "W" in a binary phase difference as shown in FIG. 8(a) in a bit map image.
Figure 10:
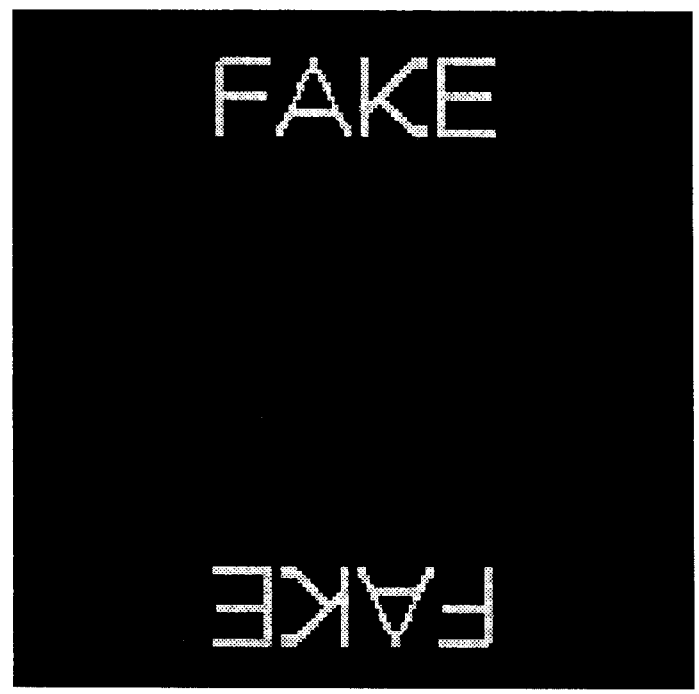

FIG. 9 is one example of a watermark hologram "W" shown as a bit map image, which is converted from 2-stage phase differences, that is, 0 and $\pi$ into a monochrome of 0 and 255. In a case that a diffraction light, which is generated by the interference phenomenon of light when a faked watermark hologram is irradiated by an illuminating light, is received by the light receptor 102, a light intensity distribution of the diffraction light or a hologram reconstructed image is designed that the word "FAKE" indicating a faked hologram appears as shown in FIG. 10.

Figure 11:
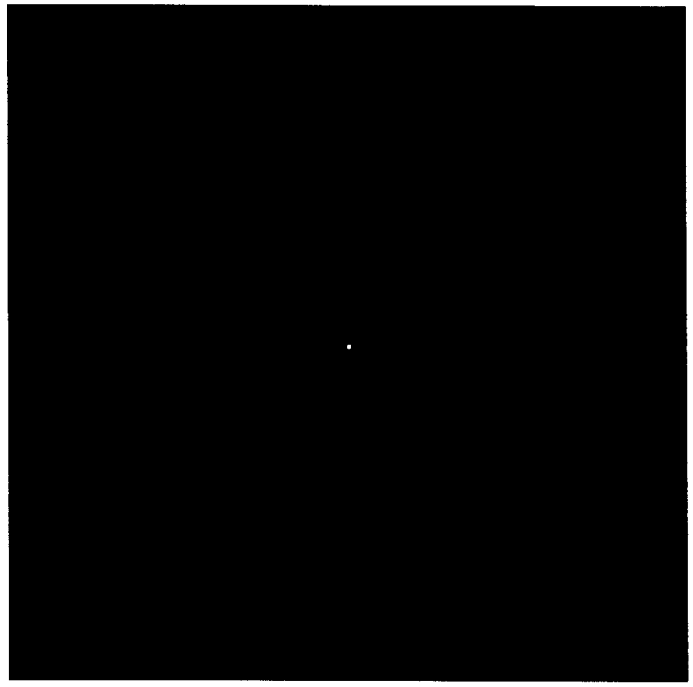
FIG. 11 is a plan view of an intensity distribution of diffraction light if a watermark hologram "W" shown in FIG. 9 is faked.

In a case of a regular hologram, a blaze in response to phase distribution of a designed value is formed on the card 100 as it is. However, in the case of a watermark hologram "W" in accordance with the present invention, depth of a blaze in response to 0 and $\pi$ is converted into 0 and $2\pi\times n$ respectively and utilized, where "n" is a natural number such as 1, 2 and 3. With assuming that "n" is 1, a blaze in response to 0 and $\pi$ in design is 0 and $2\pi$ in an actual watermark hologram "W". In this case, a binary phase difference is $2\pi$, which is equivalent to one period of a wave length, so that a diffraction light is not generated since an illuminating light does not interfere although the blaze is irradiated by the illuminating light. In a case that a phase difference is $2\pi\times n$, the phase difference is equivalent to "n" periods of a wave length, so that interference does not occur although the blaze is irradiated by the illuminating light. An output of the watermark hologram "W" in accordance with an incident light is only the zero-order light. Accordingly, only one dot of high intensity caused by a focal point of the zero-order light is taken in the center of the image, thus the image is totally black except one white dot in the middle of the image as shown in FIG. 11.

Since the phase difference of the watermark hologram "W" is $2\pi\times n$ as mentioned above, the watermark hologram "W" is characterized by that an irradiated light on the watermark hologram "W" just transmits through or is reflected by the watermark hologram "W" and no diffraction light appears. In a case that a faked blaze is produced by pouring liquid resin into a blaze surface and making the liquid resin harden as mentioned above, a blaze depth of a watermark hologram "W" varies because a height accuracy of the faked blaze is deteriorated. Accordingly, a diffraction pattern of a watermark hologram "W" designed by binary such as a word "FAKE" as shown in FIG. 10 appears. In this case, the diffraction pattern "FAKE" appears clearly in accordance with a blaze depth. The more the blaze depth 2π×n approaches π×n, the more the diffraction efficiency increases and the more clearly the diffraction pattern "FAKE" appears.

Accordingly, since the card 100 of the present invention is formed on a same surface of a substrate with a plurality of data holograms "Ds" and watermark holograms "Ws" mixed in arbitrary locations and ratios of both holograms, a phenomenon such that diffraction efficiency of the watermark hologram "W" increases, besides diffraction efficiency of the data hologram "D" decreases occurs, if a blaze depth changes by fake. In a case that a phase of a watermark hologram "W" approaches 2π×n, an output of the watermark hologram "W" in response to an incidental light tends to increase zero-order light as shown in FIG. 11. However, if a dynamic range of the light receptor 102 is narrow, it is possible that the data hologram "D" is detected in rather weak intensity, besides the zero-order light is detected in emphasized intensity. Thus, the recognition apparatus 104 for diffraction light can detect diffraction light in higher accuracy through a process that the zero-order light processing apparatus 103 replaces the intensity of the zero-order light with "0" and amplifies total intensity of diffraction light excluding zero-order light with a predetermined gain.

Figure 12:
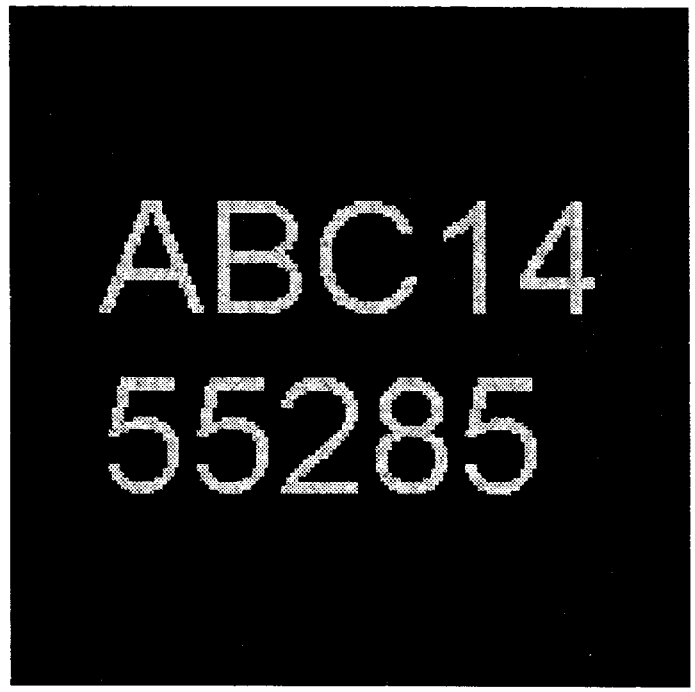
FIG. 12 is a first example showing a plan view of an intensity distribution of diffraction light by a true watermark hologram.
Figure 13:
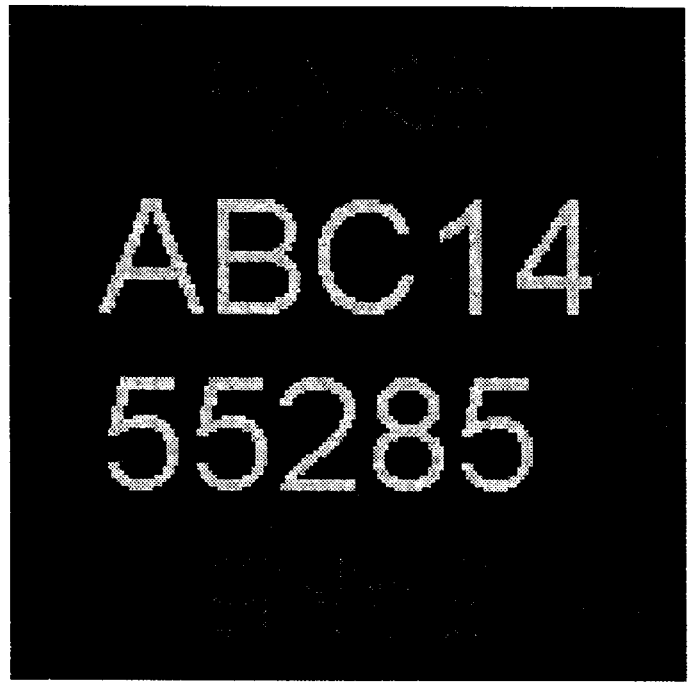
FIG. 13 is a second example showing a plan view of an intensity distribution of diffraction light by a faked watermark hologram.

FIGS. 12 through 16 show various kinds of intensity distribution of diffraction light or hologram reconstructed images. FIG. 12 shows that the hologram unit cell 100a is produced so as to be 100% of a phase difference as designed. In this case, only diffraction light of data hologram "D" appears, besides diffraction light of watermark hologram "W" does not appear at all. In other words, information or data such as "ABC 14 55285" included in the data hologram "D" appear on the image. However, the "watermark" or the word "FAKE" does not appear on the image. FIG. 13 shows that the hologram unit cell 100a is faked and produced with having a phase difference in 95% of a designed phase difference. In this case, diffraction light of data hologram "D" appears and diffraction light of watermark hologram "W", that is, the word "FAKE" appears slightly.

Figure 14:
FIG. 14 is a third example showing a plan view of an intensity distribution of diffraction light by a faked watermark hologram.
Figure 15:
FIG. 15 is a fourth example showing a plan view of an intensity distribution of diffraction light by a faked watermark hologram.
Figure 16:
FIG. 16 is a fifth example showing a plan view of an intensity distribution of diffraction light by a faked watermark hologram.

FIG. 14 shows that the hologram unit cell 100a is faked and produced with having a phase difference in 90% of the designed phase difference. In this case, diffraction light of data hologram "D" appears and diffraction light of watermark hologram "W" appears stronger than that of one shown in FIG. 13. In other words, the word "FAKE" appears more clearly than that of shown in FIG. 13. FIG. 15 shows that the hologram unit cell 100a is faked and produced with having a phase difference in 80% of the designed phase difference. In this case, diffraction light of data hologram "D" appears almost the same level as that of watermark hologram "W" or the word "FAKE". FIG. 16 shows that the hologram unit cell 100a is faked and produced with having a phase difference in 70% of the designed phase difference. In this case, diffraction light of data hologram "D" is weakened, besides diffraction light of watermark hologram "W" or the word "FAKE" appears stronger than that of data hologram "D".

Accordingly, the recognition apparatus 104 judges that the card shown in FIG. 12 is a true card and the cards shown in FIGS. 13 through 16 are fake cards by comparing a plurality of intensity distribution of diffraction light previously registered as reference data with data transmitted from the zero-order light processing apparatus 103.

According to another aspect of the present invention, there provided an optical recording medium, which is formed with a plurality of phase watermark holograms and phase holograms, which represent data, mixed in arbitrary locations and ratios of both holograms on a same surface of a substrate.

As mentioned above, according to the present invention, a watermark hologram, which appears when a phase difference changes, is recorded in view of a phenomenon that a phase difference changes if a blaze constituting a hologram is faked. Therefore, it is accurately judged whether an information is true or fake, if the hologram is recorded for the purpose of judgement.

What is claimed is:

1. An optical recording medium in which a blaze having a binary phase difference of 2π×n is formed as a phase watermark hologram, where "n" is a natural number of more than 1.

2. An apparatus for judging whether an optical recording medium in which a blaze having a binary phase difference of 2π×n is formed as a phase watermark hologram, where "n" is a natural number of more than 1, is true or fake, said apparatus comprising:

illuminating means for illuminating said phase watermark hologram by monochromatic light;

two-dimensional image sensing means for taking a two-dimensional image of diffraction light generating said phase watermark hologram;

zero-order light processing means for assigning to zero the intensity of a zero-order light component of an intensity distribution signal of diffraction light taken by said two-dimensional image sensing means and for amplifying the total intensity distribution signal of diffraction light defined by the intensity of the zero-order light being at the level zero; and judging means for judging whether said optical recording medium is true or fake by comparing the intensity distribution signal of diffraction light processed by said zero-order light processing means with a reference data.

* * * * *